United States Patent [19]

Tegeler

[11] Patent Number: 5,735,215
[45] Date of Patent: Apr. 7, 1998

[54] RAIL-BORNE MOTIVE POWER UNIT

[75] Inventor: Ferdinand Tegeler, Berlin, Germany

[73] Assignee: ABB Henschel Aktiengesellschaft, Berlin, Germany

[21] Appl. No.: 654,533

[22] Filed: May 29, 1996

Related U.S. Application Data

[63] Continuation of PCT/EP95/03778, Nov. 23, 1995 published as WO96/10508, Apr. 11, 1996.

[30]  Foreign Application Priority Data

Nov. 30, 1994 [DE] Germany .................. 9415770 U

[51] Int. Cl.⁶ .................................. B61C 3/00; B61C 7/00
[52] U.S. Cl. .................... 105/34.1; 105/34.2; 105/35; 105/49; 105/62.2
[58] Field of Search .......................... 105/27, 34.1, 34.2, 105/35, 49, 59, 61, 62.1, 62.2

[56]  References Cited

U.S. PATENT DOCUMENTS

| | | | |
|---|---|---|---|
| 2,342,724 | 2/1944 | Candee | 105/35 |
| 2,667,843 | 2/1954 | Dean | 105/35 |
| 3,713,504 | 1/1973 | Shimer et al. | 105/35 |
| 4,095,147 | 6/1978 | Mountz | 105/35 |
| 4,702,291 | 10/1987 | Engle | 105/35 |
| 4,900,944 | 2/1990 | Donnelly | 105/35 |

*Primary Examiner*—S. Joseph Morano
*Attorney, Agent, or Firm*—Herbert L. Lerner; Laurence A. Greenberg

[57]  ABSTRACT

The invention relates to a rail-borne power unit for conveying passengers. The unit has at least one coach section formed by a coach body with at least one passenger compartment for passengers and with a driver's cab at one or both ends. The coach body is supported on running-gear assemblies formed by wheelsets and driven by at least one drive unit. The rail-borne power unit is a low-floor vehicle in which a central part of the coach body is lowered relative to its end parts. At least one end part of the rail-borne power unit is designed as a motor-coach head. The unit is selectively driven by at least one diesel-mechanical drive, or a diesel-electric drive, or a purely electric drive, or a multi-system drive formed by a combination of a diesel-electric drive with a purely electric drive, or a multi-system drive formed by a combination of two different electric drive variants, or a multi-system drive formed by a combination of a diesel-electric and two different electric drive variants. An electric drive motor drives at least one axle of one of the running-gear assemblies.

28 Claims, 6 Drawing Sheets

CURRENT CONVERTER

RAIL-BORNE MOTIVE POWER UNIT

CROSS-REFERENCE TO RELATED APPLICATION

This is a continuation of international application Ser. No. PCT/EP95/03778, filed Nov. 23, 1995, published as WO96/10508, Apr. 11, 1996 which designated the United States.

BACKGROUND OF THE INVENTION

Field of the Invention

The invention relates to a rail-borne motive power unit for conveying passengers, with at least one coach section, which coach section is formed by a coach body with at least one passenger compartment to accommodate passengers and with a driver's cab at at least one end and with running-gear assemblies formed by wheelsets and with at least one traction motor as a drive unit.

Rail-borne motive power units for conveying passengers have long been universally known, e.g. as motor coaches or as electrically operated motor coaches for urban high-speed railway traffic; they are generally used for local passenger traffic on sections which carry large numbers of passengers.

Owing, essentially, to the stresses which occur due to the drive, whether a diesel-electric or a purely electric drive, the prior art motor coaches are configured in accordance with the current standards and delivery conditions to take high forces. This has a disadvantageous effect on their structural configuration and, associated with this, also on their weight.

Another problem with the use of mass-transport vehicles of the foregoing kind is the energy supply for the drive units. While electrification of railway lines is continuing, so that the main lines can accommodate electrically operated vehicles to a large extent, there still exist a multiplicity of secondary lines which are not electrified and therefore make a different drive concept necessary.

This results in a further problem, namely that on certain sections, for example in relatively long tunnel sections, only emission-free, i.e. electrically operated, motive power units are permitted. Motive power units which cause emissions, for example diesel engine driven coaches, are not allowed to enter into such sections, thus necessitating a transfer of the passengers being conveyed by those coaches to transfer to electrically operated vehicles.

It is, furthermore, often desirable, for the purpose of connecting regional destinations to city-center destinations, to have available a vehicle which can, on the one hand, be used on the urban or underground railway system and, on the other hand, can be operated on an overhead line or independently of the mains at regional range.

SUMMARY OF THE INVENTION

It is accordingly an object of the invention to provide a rail-borne power car of the above-mentioned type which overcomes the shortcomings and disadvantages of the prior art devices and which permits use in local passenger traffic, i.e. on any railway lines with short distances between stops, and, also, allows the passengers to have an uninterrupted trip and, depending on the height of the platform, permits them to enter as far as possible by a single step or without a step; it should also be possible to adapt the driving power as required to and select and combine the different types of drives as required.

With the foregoing and other objects in view there is provided, in accordance with the invention, a rail-borne motive power unit for conveying passengers, comprising:

a low-floor vehicle coach body having a central part and at least one end part, the central part housing a passenger compartment and being lowered relative to the at least one end part;

the at least one end part being embodied as a motor-coach head and housing a driver's cab; running-gear assemblies supporting the coach body, and at least one electric drive motor drivingly connected to at least one of the running-gear assemblies; and a drive unit drivingly connected to the at least one drive motor, the drive unit comprising a drive selected from the group of a diesel-mechanical drive, a diesel-electric drive, a purely electric drive, a multi-system drive formed by a combination of a diesel-electric drive with a purely electric drive, a multi-system drive formed by a combination of two different electric drive variants, a multi-system drive formed by a combination of a diesel-electric and two different electric drive variants.

In other words, the objects are satisfied in that the rail-borne motive power unit is constructed as a low-floor vehicle in which a central part of the coach body is lowered relative to the end parts, and that at least one drive unit is provided, which is formed by a diesel-mechanical drive or by a diesel-electric drive or by a multi-system drive formed by a combination of a diesel-electric with a purely electric drive or by a multi-system drive formed by a combination of two different electric drive variants or by a multi-system drive formed by a combination of a diesel-electric with two different electric drive variants. This allows the passengers to travel from the regional area directly to the city railway or underground railway network without changing.

In accordance with an alternative solution of the invention, therefore, a rail-borne motive power unit is constructed as a low-floor vehicle, in which a central part of the coach body is lowered relative to the end parts, which is optionally equipped with a diesel-mechanical drive or a diesel-electric drive or a purely electric drive. The second solution is of particular importance where it can be foreseen that alternative sources of energy will not be available or that special operating regulations concerning the drive energy source will not have to be followed, while the requirements made of local passenger traffic with regard to ease of entry into the coach (.e. if possible step-less entry), have to be complied with.

Accordingly, the invention on the one hand makes it possible to significantly reduce the distance between the floor level of the passenger compartment and the level of the respective platform in comparison with the known motor coaches and, on the other hand, of being able to use one basic model for different types of drive or of traveling along any desired line sections with a combined drive without the need for an interruption to the trip because of the impermissibility of the drive component installed in a particular power unit.

It is thereby possible for at least one end part of the rail-borne motive power unit to be configured as a motor-coach head with a driver's cab, from where the motor coach can be controlled. A diesel-mechanical drive or a diesel-electric drive or a purely electric drive or a multi-system drive formed by a combination of a diesel-electric and a purely electric drive or a multi-system drive formed by a combination of two different electric drive variants or a multi-system drive formed by a combination of a diesel-electric and two different electric drive variants can again optionally be provided as the drive unit. It is advantageous for the drive to be disposed underneath one end part, preferably beneath the motor-coach head. Furthermore, the drive acts on at least one axle of a running-gear assembly.

The motive power unit according to the invention can be of single-section or multi-section design, for example of three-section or four-section design, the respective outer ends in each coach body then being provided with a motor-coach head accommodating a driver's cab; the inner coaches do not have a driver's cab in that case. The motive power unit is thus enabled for push-pull running.

The running-gear assemblies of the motive power unit according to the invention may be in single-axle construction in double-axle running-gear assemblies. The latter being arranged in bogies.

In accordance with an additional feature of the invention, the drive unit, which is preferably disposed underneath the motor-coach head, is a diesel-mechanical drive with a liquid-cooled diesel engine. The latter drives the driven axles via a, preferably automatic, multi-speed transmission. The transmission, by way of example, is disposed parallel and adjacent to the diesel engine. It is also possible for starting converters and retarders to be incorporated in the power transmission path between the drive unit and the drive axles.

In accordance with another feature of the invention, there is provided, instead of the diesel-mechanical drive, at least one electric traction motor, which is powered from a diesel generator or from a mains system via power lines or live rails. As an alternative, one traction motor can be provided for each driven axle or each running-gear assembly (=bogie) or it can be configured as a wheel-hub motor.

As already explained, the combination of a diesel-electric and a purely electric drive in one vehicle is furthermore also possible, so that, in practice, the changeover of the supply to the traction motors, which are in this case formed exclusively by electric motors, can take place by switching over from one source of energy—mains operation—to the other source of energy—isolated-network operation from the diesel-driven generator.

It is furthermore possible, as mentioned, that the two purely electric types of drive (DC drive and AC drive) are combined in one vehicle, so that, in practice, the changeover of the supply to the traction motors, which in this case are formed exclusively by electric motors, can take place by switching over from one source of energy—mains operation from the AC system—to the other source of energy—mains operation from the DC system.

Finally, the combination of a (closed-loop) diesel-electric type of drive and the two (open-loop) purely electric types of drive (DC drive and AC drive) in one vehicle is possible, so that, in practice, the changeover of the supply to the traction motors, which in this case are formed exclusively by electric motors, can take place by switching over from one source of energy—first type of mains operation—to another source of energy—second type of mains operation or isolated-network operation from the diesel-driven generator.

In the preferred diesel-mechanical embodiment of the invention, it is provided that only the axles arranged under the motor-coach heads are driven, while the axles between them are not driven.

In all other embodiments apart from the diesel-mechanical embodiment, provision can be made for some of the intermediate axles or even only these axles to be driven.

Disposing the drive units beneath the motor-coach heads, which are higher than the central parts, permits a modular design of the drive unit, thus offering the possibility of providing for installation of motors matched to the respective power requirement and of transmissions matched to these motors without this resulting in space problems or the need for structural modifications to the coach body.

It is possible, in accordance with the invention as a combined diesel-electric/electric drive, to omit some components for operation with just one source of energy. This will be explained in more detail in the following, including function, structure and interaction of the components.

The motive power unit according to the invention can be configured as a pure single-system vehicle or as a multi-system vehicle. The multi-system motive power unit according to the invention is a vehicle for one or more alternative types of energy supply. It is possible to combine electric operation from the overhead AC system, electric operation from the DC system, and diesel-electric operation as operating variants. As a single-system vehicle provision is made for one of these operating variants, and a purely diesel-mechanical drive is thus possible in a single-system vehicle.

If the vehicle is provided with a diesel-electric drive, it can be used on non-electrified secondary lines independently of the overhead system. The vehicle according to the invention can be operated from the overhead line by means of a drive path for operation from the AC system. In addition or as an alternative, the vehicle according to the invention can be equipped with a drive path for operation from the DC system, allowing operation on city railways and underground railway lines with a DC supply, via a live rail or an overhead line for example.

The various drive variants can be combined and hence permit the construction of a multi-system vehicle for operation on lines constructed in different ways.

One vehicle can furthermore contain a plurality of drive systems, each of which is embodied as a single- or multi-system drive. In the normal case, all the drive systems are identical but, depending on requirements, it is also possible to use different drive systems. The multi-system vehicle according to the invention can be of single-section or multi-section configuration and be provided with one or more drive groups. Depending on its design, each drive group can be provided with one or more traction motors.

In all cases, the following description relates only to a single drive system. Where there is a plurality of drive systems in the vehicle, there can accordingly be a plurality of the parts described in the vehicle.

Each drive system can be divided into four parts, namely into the supply system comprising one or more supply paths, into the intermediate circuit, the supply for the auxiliaries, comprising one or more converters for the auxiliaries, for the purpose of supplying the respective auxiliaries and generating the required control voltages, and into the traction-motor the comprising one or more converters for driving the electric drive motors. The supply for the auxiliaries and the traction-motor the are referred to below jointly as load.

The supply system comprises one or more feed paths, which are connected in parallel with the intermediate circuits and which can be used alternately to feed the intermediate circuit, and hence permits operation on different lines. Appropriate paths can be provided depending on the requirements of the vehicle. The possible feed paths are AC paths, DC paths with and without an interface circuit and generator paths. They are described in the following paragraphs.

The AC path serves to feed the intermediate circuit from the overhead AC line (e.g. 15 kV with $\nu=16\frac{2}{3}$ Hz). As its essential components, the AC path comprises one or more current collectors, a transformer which steps down the overhead line voltage, and a converter or rectifier for generating the intermediate-circuit DC voltage. A charging circuit for the controlled charging of the intermediate circuit and filter circuits may furthermore be provided, if required.

The DC path with interface circuit serves to feed the intermediate circuit from a live rail or an overhead DC line. As its essential components, the DC path comprises one or more current collectors and an interface circuit (optionally, for example, with step-down converter, step-up converter, two-quadrant converter or some other kind) for adaptation of the live-rail voltage to the intermediate-circuit voltage. A charging circuit and filter circuits may furthermore also be included, if required. Among other things, the interface circuit allows design for operation from systems with a very high DC voltage.

The DC voltage path without an interface circuit likewise serves to feed the intermediate circuit from a live rail or an overhead DC line with a mean DC voltage of, say, 750 V. However, that circuit does not contain an interface circuit, so that the intermediate-circuit voltage and the live-rail voltage are coupled directly to one another. As essential elements, the DC path includes current collectors and a switch for disconnecting the intermediate circuit from the live rail. A charging circuit and filter circuits may also be included.

The generator path serves to feed the intermediate circuit independently of electricity supply systems from a generator driven by an internal combustion engine (e.g. diesel engine). The essential parts provided are an internal combustion engine, a generator and a rectifier for feeding the intermediate circuit.

In many cases, however, it is advantageous to combine the feed paths, making double or multiple use of components. It is then no longer possible to make such a clear distinction between these paths, thus giving rise to combination paths such as, for instance, a combined DC and AC voltage path. The invention allows a virtually "infinite" variety of possible combinations in practice, each with different advantages and disadvantages. A person of skill in the art will carefully choose from possible and feasible options.

The intermediate circuit smoothes the currents supplied by the rectifiers, DC converters or four-quadrant converters in the various feed paths and it makes available a constant intermediate-circuit voltage. The intermediate circuit essentially comprises one or more intermediate-circuit capacitors. In certain cases, a braking controller comprising a braking resistor and a switching element (transistor, IGBT, GTO or the like) is required in addition.

The supply system for the auxiliaries provide voltages to feed the auxiliaries and to supply the electronic equipment. It comprises one or more converters, which are fed from the intermediate circuit and which generate the corresponding voltages. Auxiliaries are, for example, radiator fans, lighting, electric heating, air-conditioning systems, etc.. Electronic equipment includes, for example, control systems, monitoring systems, and instrumentation.

The traction-motor supply generates the voltage system—required for the drive motors—from the intermediate-circuit voltage. The supply essentially comprises one or more converters, each of which feeds one or more traction motors. Three-phase or DC machines can be used as traction motors. In corresponding fashion, three-phase inverters are used as converters to generate a three-phase system, and DC converters are used as converters to establish the required DC voltages. Other features which are considered as characteristic for the invention are set forth in the appended claims.

Although the invention is illustrated and described herein as embodied in a rail-borne motive power unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
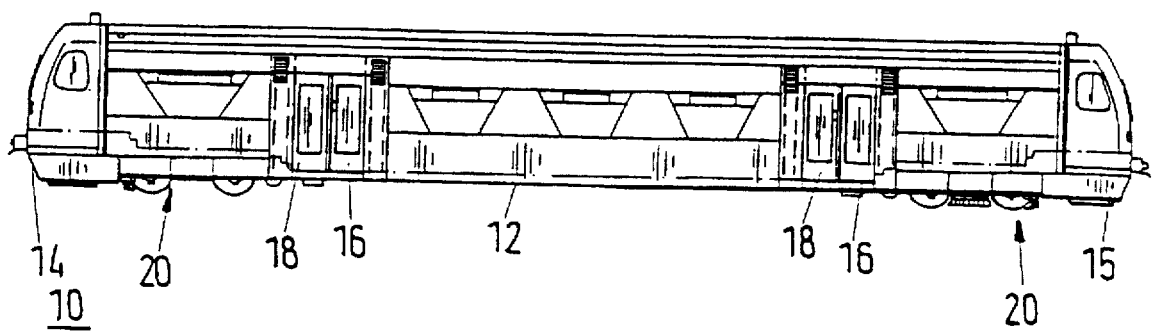
FIG. 1 is a side elevational view of a one-piece motor coach in accordance with the invention.

Referring now to the drawing in detail, and first, particularly, to FIG. 1 thereof, there is seen a motor coach 10 with a central part 12 and motor-coach heads 14, 15 adjoining the latter at the ends. At its ends, the central part 12 has respective entry zones 16 with doors 18, which are in each case adjoined by the motor coach heads 14, 15.

Figure 2:
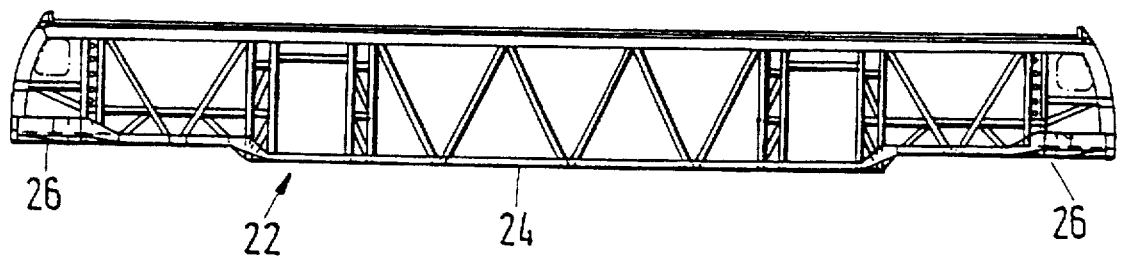
FIG. 2 is a side elevational view of a coach body of the motive power unit in accordance with FIG. 1.

The motor coach 10 has two running-gear assemblies 20, which are constructed as motor bogies. The bogies are illustrated in the enlarged bottom view of FIG. 3. The running-gear assemblies 20 are arranged underneath the motor-coach heads 14, 15, which are at a higher level than the central part 12, thus making space for the wheel sets of the running-gear assemblies 20 and for the drive unit. With particular reference to FIG. 2, the central part 12 is offset relative to the raised head floors by its low-floor construction. The entry zones 16 are thus as close to the ground as possible and passengers are enabled to enter and exit easily and quickly.

Owing to the importance of publicly appealing design in the context of public transportation systems, the motor-coach heads 14, 15 are provided in the region of the running-gear assemblies with a cladding which conceals the running-gear units and the drive units. This results in the impression of a low-slung vehicle.

Again with reference to FIG. 2, which shows a coach body 22 for the motive power unit 10 of FIG. 1, there is provided an elongated central region 24 corresponding to the central part 12 of FIG. 1, adjoining which at both ends there are head members 26 which are raised relative to the floor level of the central region 24. The head members 26 correspond to the motor-coach heads 14, 15 and are provided for the purpose of accommodating respective driver's cabs.

Figure 3:
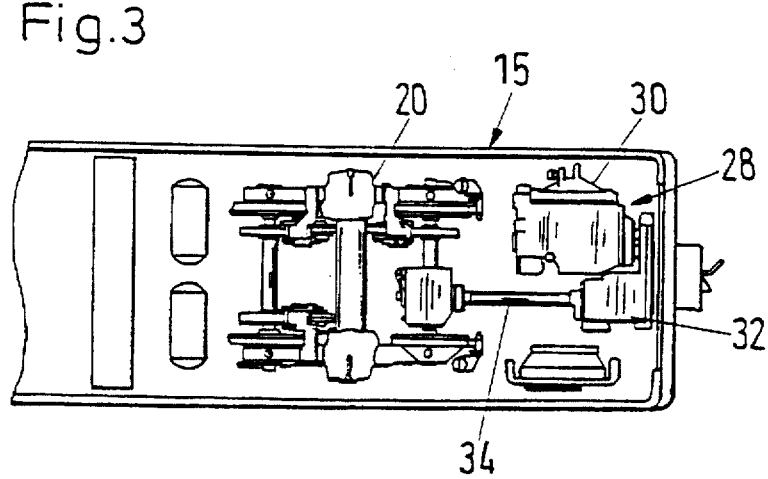
FIG. 3 is a partial bottom plan view of a motor-coach head.

The reason for the stepped offsetting of the head members 26 is that the respective drive units 28, illustrated in bottom view in FIG. 3, with the bogies 20 have to be accommodated here and, in particular, that a minimum clearance is necessary because of the wheel diameter required.

The illustration in FIG. 3 shows a motor-coach head 15 of a single-system motor coach 10 from its underside, and, as can also be seen from FIG. 1, the respective running-gear assemblies 20 are arranged near to the entry zones 16, while the drive unit associated with the running-gear assembly 20 is arranged in the region remaining between the running-gear assembly and the end of the coach. The drive unit 28 shown here comprises a water-cooled diesel engine 30 which is connected to the running-gear assembly 20 via a transmission 32, which is preferably designed as a multi-speed automatic transmission, and a drive shaft 34.

Depending on the requirements, it is possible for only one axle of the motor bogie to be actively driven, or both axles may be driven.

The coach body is preferably supported on the bogies by means of pneumatic springs, these being connected in series with wear-free, rubber-spring elements. The rubber-spring elements here serve as emergency springs if the pneumatic springs are faulty.

Some explanation will now be given with regard to the subassemblies of the power train, in particular the transmission with a hydraulic torque converter, provided for use in the case of the rail-borne motive power unit according to the invention. A combined mechanical and hydraulic transmission of the motive power is provided with a view to operation which, on the one hand, is as comfortable as possible and, on the other hand, as economical and hence environmentally friendly as possible. The components provided for this purpose utilize the principle of power distribution of power division, which is achieved with a differential converter. This combines the advantages of two different systems of power transmission, namely that of hydrodynamic transmission and that of mechanical transmission. The primary advantages of hydrodynamics are gentle and therefore largely wear-free starting with a high tractive output, in rapid starting acceleration without gear-changing and in virtually wear-free braking. The primary advantages of the mechanical drive are found in the low-loss power transmission combined with high efficiency. The invention herein utilizes the respective advantages in an optimized manner, in that the particular system is employed in the novel rail-borne motive power unit whenever they are at their most efficient and most economical.

The hydrodynamic system is used for starting. The novel rail-borne motive power unit starts gently with a high tractive effort and accelerates rapidly without gear-changing. The hydrodynamic system assumes the task of braking (about 80% of all braking operations) from all speeds to virtually 0 km/h (standstill). The rail-borne motive power unit is braked gently but very effectively without brake wear and without the risk of so-called fading, i.e., without diminution of the braking action.

The mechanical system makes an increasing contribution to power transmission even during starting. As soon as the differential converter exceeds its maximum efficiency, its task is taken over completely by the mechanical system.

The hydraulic torque converter acts as a hydrodynamic retarder, which is connected upstream of the mechanical service brake. It is effective over the entire driving range, irrespective of whichever gear is engaged. The kinetic energy of the vehicle is converted in the converter into heat and dissipated via the heat exchanger.

The result is substantially reduced wear and a longer service life for the brake linings, less braking noise and no noise from exhaust cutout brakes.

The differential converter which is provided for use with the rail-borne motive power unit according to the invention is a torque converter. There is connected upstream thereof a planetary gear unit acting as a differential; the planetary gear is divided, for the purpose of power division, into an hydraulically acting and a purely mechanical component. Purely hydrodynamic power transmission is provided in this case only at the starting point in first gear. With increasing travel speed, an increasing proportion is transmitted mechanically (external power division). The proportion is 50/50 upon changing to second gear. All further gears are purely mechanical.

The structure of the differential converter/transmission block used with the novel rail-borne motive power unit is known per se. A transmission of this kind is supplied as a finished component and integrated into the rail-borne motive power unit. It is a fully automatic hydrodynamic-mechanical transmission, the torque converter of which is used for acceleration and deceleration (braking).

The hydrodynamic converter is a birotary converter. Ahead of the converter there is connected the converter pump brake, the through-connection clutch, the differential gear unit for power splitting and the input clutch. Following the converter there is connected a planetary gear unit which combines the hydrodynamic and mechanical forces.

The third planetary gear unit is used to select the reverse gear and to direct the energy into the converter during braking. A spring coupling at the input of the gear unit damps the vibrations of the engine. The gear unit is shifted hydraulically; the gear-change commands originate from the electronic control system. The heat exchanger is incorporated into the cooling circuit of the engine.

The engine is connected to the drive shaft and a revolving plate and piston carrier via a torsional damper. With the input clutch disengaged, only one gear pump is driven, supplying the converter, the control system and the lubricating system with the necessary pressurized oil.

With the input clutch engaged, the engine power is transmitted to the outer ring of the differential. During starting, the input shaft and the planet carrier connected thereto are stationary while the sun wheel and the pump impeller are driven in opposite directions of rotation via the planet wheels. In the converter, the oil accelerated by the pump impeller flows in the closed circuit through the stator and through the turbine rotor. The converted, i.e., increased, torque output by the turbine rotor is transmitted to the output shaft via the planet wheels and the planet carrier of the turbine transmission, the multi-disk brake of which is engaged.

The change to second gear with purely mechanical power transmission is performed automatically in dependence on the travel speed and the engine charge. The multi-disk brake is engaged and the pump impeller thus halted and hence hydrodynamic power transmission switched off. At the same time, the turbine rotor is disconnected by the opening of the multi-disk brake of the turbine transmission. The transmission ratio of the second gear corresponds to that of the differential.

At about 70% of maximum speed, the input clutch opens automatically, while the so-called through-connection clutch engages. The input shaft is thus connected directly to the output shaft, and a transmission ratio of 1:1 is established.

According to an alternative embodiment, the input clutch can disengage automatically at just 50%, approximately, of the maximum speed while the through-connection clutch engages and the input shaft is thus connected directly to the output shaft and a transmission ratio of 1:1 likewise results.

In the last-mentioned alternative, the automatic changeover from third to fourth gear takes place at about 70% of the maximum speed. Here, the clutch engages, while the through-connection clutch disengages. This gear makes it possible to use the same final drive ratio irrespective of the application, while taking into account the specific design speed in each case.

If further gears (transmission ratios) are provided, for example six gears, in order to achieve a better acceleration behavior during starting, corresponding further differentiation of the gear switch points is required.

During braking operation, the turbine rotor is driven by the overrunning vehicle via the planetary gear unit. Here, the multi-disk brake of the planetary gear unit is engaged. The turbine rotor is driven counter to its direction of rotation in the case of travel in first gear and acts as an axial pump which pumps the oil against the locked pump impeller and the stator. The kinetic energy which is converted into heat during this process is dissipated via the heat exchanger.

It is possible to interrupt the power transfer between the engine and the transmission under certain circumstances by disengaging the transmission input clutch. This operation is initiated automatically and, depending on the number of stops and traffic conditions, can lead to a saving in terms energy usage.

The converter block described above is combined with any water-cooled or air-cooled, charge-regulated or speed-regulated diesel engine which is conventional in the pertinent art to give a complete drive block. By means of different transmission ratios of the differential transmission and various pump impellers which vary in their power consumption, it is possible to match the engine and transmission to one another in an optimum manner, making it possible to produce a vehicle which is optimally matched in terms of its drive components to any use.

Figure 4:
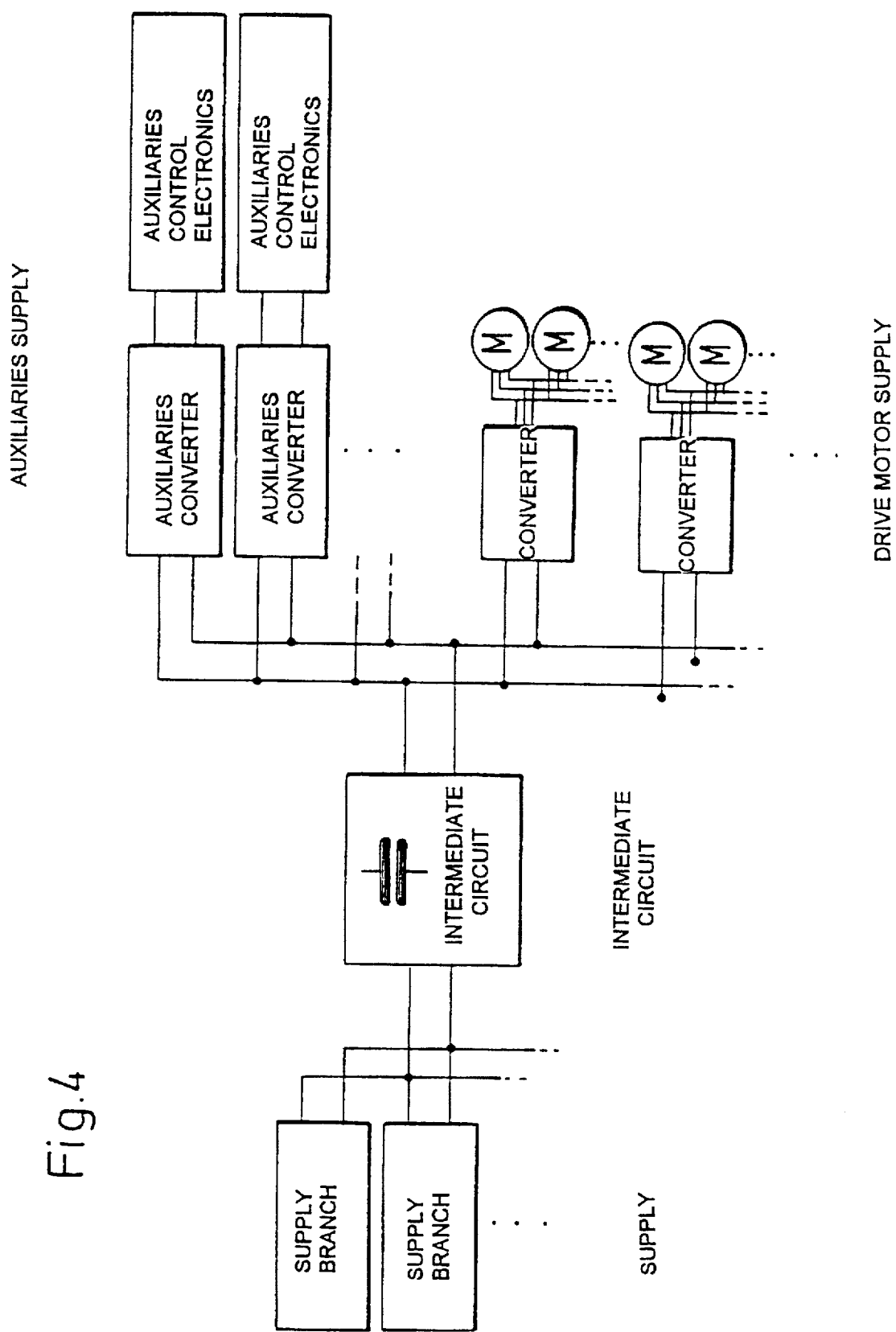
FIG. 4 is a diagram illustrating an overview over the basic structure of a single- or multiple-system drive.

The equipment provided for electric AC operation, DC operation, diesel electric operation and multi-system operation will be explained in greater detail below, with particular attention to the electrical components, with reference to the circuit arrangement shown in FIG. 4. Individual electrical components and circuit configurations utilized herein are known in principle, albeit not in conjunction with the power unit according to the invention.

Figure 5:
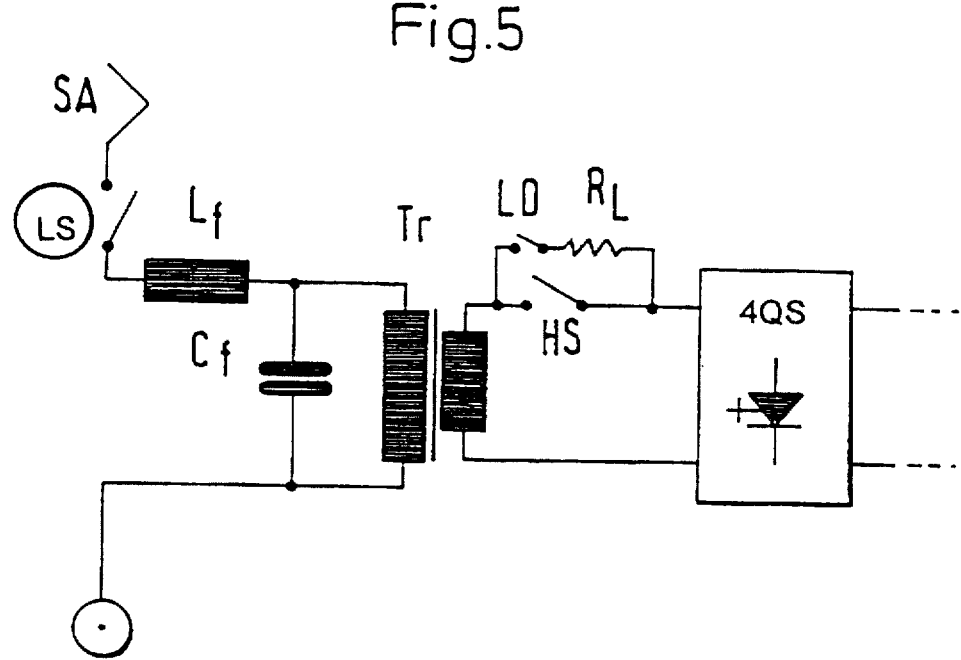
FIG. 5 is a circuit diagram for an AC supply for a motor coach in accordance with FIG. 1.

As already mentioned, the AC path serves to provide the intermediate-circuit energy from the AC overhead-line system (e.g. 15 kV, 16⅔ Hz). With reference to FIG. 5, it comprises a current collector (SA), a power switch (LS), a filter circuit (Lf, Cf), a transformer (TR), a charging circuit (RL, LD), a main contactor (HS) and a four-quadrant converter (Q4S).

Various alternatives are envisioned for the allocation of current collectors (SA) and drive units. Thus, each drive unit can be supplied by its own pantograph, one pantograph per vehicle can be used to supply all the drive units, or a plurality of interconnected and alternately operated pantographs for the common supply of all the drive units in the vehicle can be used. In FIG. 5, the embodiment with one pantograph per drive unit is shown.

The power switch (LS) allows for the complete disconnection of the AC path from the mains.

To suppress harmonics, it is advantageous to provide a filter circuit, which comprises a filter inductor (Lf) and a filter capacitor (Cf) which are operated ahead of the transformer (TR) directly on the mains.

The transformer (TR) converts the high overhead-line voltage to lower values, the transformation ratio being chosen in such a way that the transformer voltage is below the minimum permissible intermediate-circuit voltage in the case of loading, thus allowing the following four-quadrant converter to be operated at all times as a step-up converter. In order to make a defined input inductance available to the four-quadrant converter, the transformer (TR) can be embodied with increased leakage inductance. In addition to the transformer function, a transformer (TR) of this kind has the function of a series inductor relative to the mains. As an alternative, it is also possible to employ a (non-illustrated) discrete longitudinal inductor in series with the transformer and the four-quadrant converter.

The four-quadrant converter (4QS) operates as a step-up converter. Together with the intermediate-circuit capacitor and the discrete longitudinal inductor or longitudinal inductor designed as a leakage inductor, it converts the alternating voltage applied to its input into a higher DC voltage. At the same time, it can be controlled in such a way that it takes only sinusoidal currents free from reactive power from the mains. In addition, it allows the braking energy to be fed back into the mains during braking.

The charging circuit is used to charge the intermediate circuit from the mains. It is necessary with most of the four-quadrant converters which can be used, in order to permit controlled charging in the case of a discharged intermediate circuit. The charging circuit comprises a charging contactor (LD) and a charging resistor (RL). The main contactor (HS) is used to bridge the charging circuit. During operation, the main contactor (HS) is closed and the charging circuit remains inactive.

Figure 6:
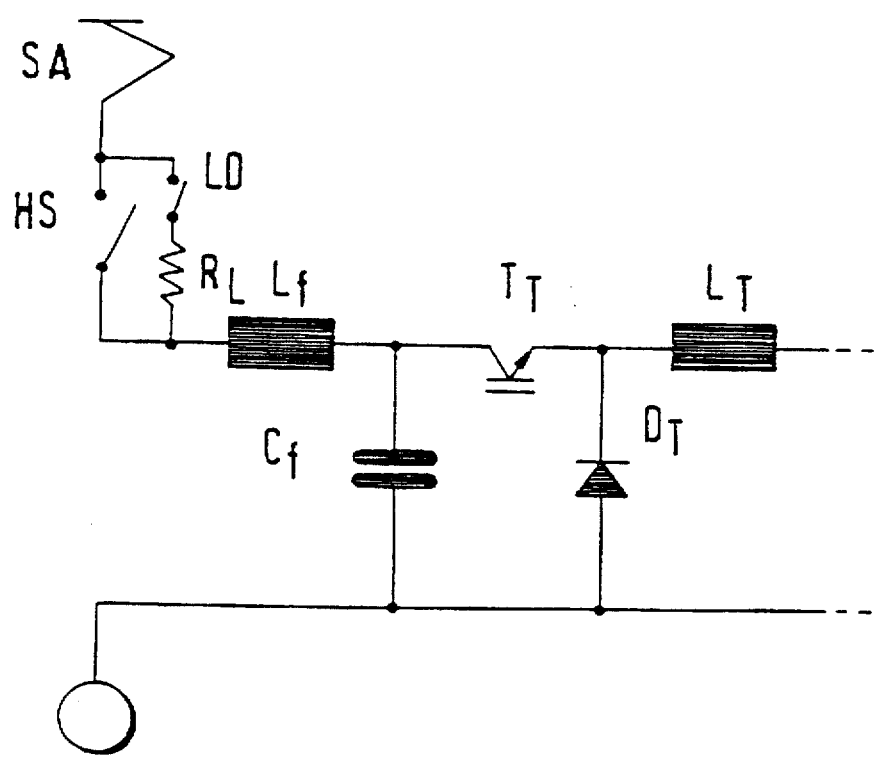
FIG. 6 is a circuit diagram for a DC supply with an interface circuit with a step-down converter.
Figure 7:
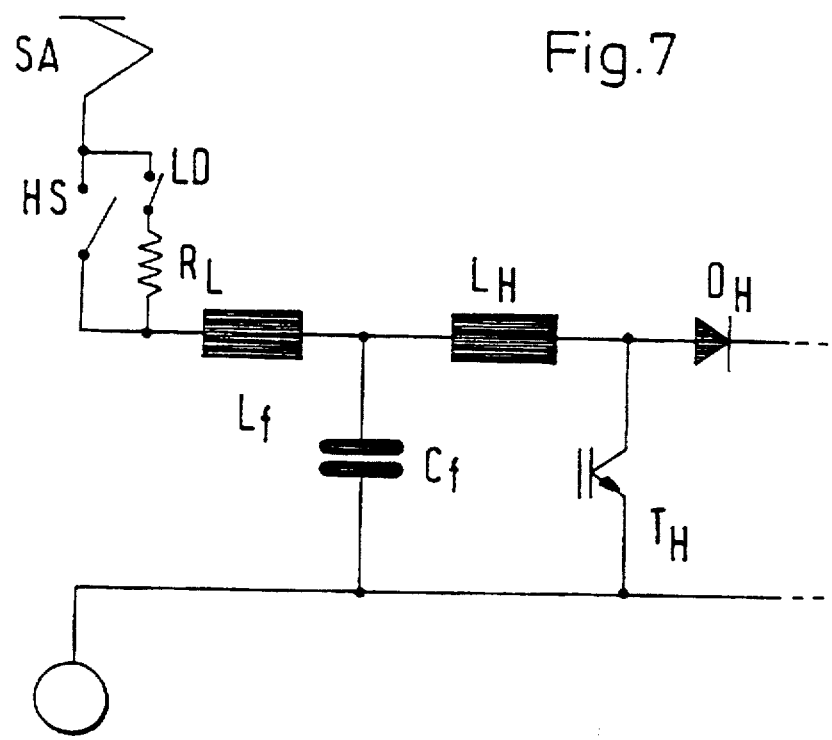
FIG. 7 is a circuit diagram for a DC supply with an interface circuit with a step-up converter.

With reference to FIG. 6, the DC path supplies the intermediate circuit from a DC voltage system (e.g. 750 V=). The DC path comprises a current collector (SA), a DC converter for adapting the rail voltage to the intermediate-circuit voltage (TT, DT, LT and LH, TH, DH), a main contactor (HS), a charging circuit (LD, RL) and a filter circuit (Lf, Cf). The DC converter is intended to decouple the intermediate-circuit voltage from the live-rail voltage. Embodiments with step-up converters and step-down converters are described below. Other embodiments, with different DC converters are conceivable, thus, for example, with a two-quadrant converter, which would allow feedback of energy. FIG. 6 shows the circuit of this path with a step-down converter and FIG. 7 shows the circuit with a step-up converter.

Current collectors for an overhead line or for a live rail are used depending on the situation. Here too, there is the possibility of providing each drive unit with its own current collector or to use one or more current collectors for all the drive units together.

Similarly to the AC voltage path, the charging circuit serves to charge up the intermediate circuit from the mains. It comprises a charging contactor (LD) and a charging resistor (RL). A main contactor (HS) serves to bridge the charging circuit. During operation, it is closed and the charging circuit remains inactive.

A filter circuit may be required to suppress the harmonics generated by the DC converter. This filter circuit comprises a filter inductor (Lf) and a filter capacitor (Cf). Other filter circuits are likewise possible.

If the intermediate-circuit voltage is higher than the live-rail voltage, a step-up converter can be used as the DC converter. The step-up converter comprises an inductor (LH), a switching element (transistor, IGBT, GTO; TH) and a diode (DH). Together with the intermediate-circuit capacitor, the converter generates a higher intermediate-circuit voltage from the live-rail voltage. It draws from the mains a substantially constant current, the level of which is dependent on the power transmitted. It seems possible that a filter circuit can be dispensed with when using the step-up converter or that this filter circuit may be made correspondingly smaller. A step-up converter does not permit any energy feedback into the mains, so that a braking controller is necessary in the intermediate circuit in all cases if an electric brake is desired.

If the intermediate-circuit voltage is lower than the live-rail voltage, a step-down converter can be used as the DC converter. This too comprises an inductor (LT), a switching element (TT) and a diode (DT). Together with the intermediate-circuit capacitor, it generates from the live-rail voltage a lower intermediate-circuit voltage, which makes it suitable for mains with very high DC voltages. It draws a pulsating current from the mains, making a filter circuit necessary in all cases. A step-down converter does not permit any energy feedback into the mains, either, and a braking controller is likewise required in the intermediate circuit if an electric brake is desired.

A wide range of other DC converter variants with different properties are conceivable, such as two-quadrant converters, forward converters and other types.

Figure 8:
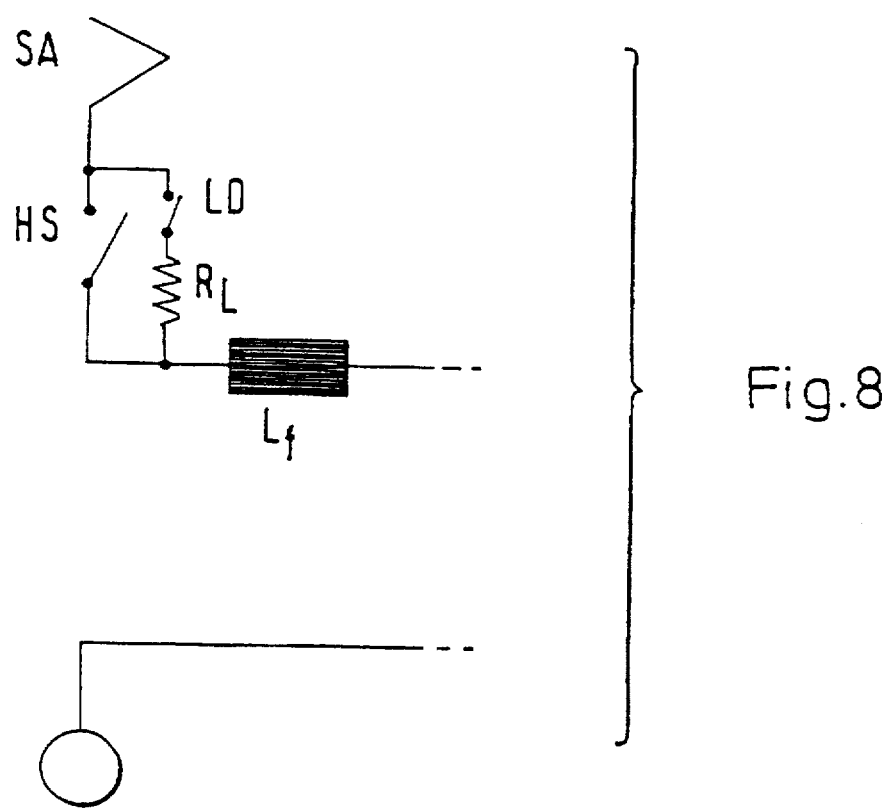
FIG. 8 is a circuit diagram for a DC supply without an interface circuit.

FIG. 8 shows the structure of a DC path without an interface circuit. A path of this kind serves to supply the intermediate circuit directly from a DC voltage system (e.g. 750 V=). It essentially comprises a current collector (SA), a main circuit-breaker (HS), a charging circuit (LD, RL) and a filter circuit (Lf+intermediate-circuit capacitor).

What has been stated above applies to the current collector (SA): current collectors for an overhead line or for a live rail are used depending on the circumstances. Here too, there is the possibility of providing each drive unit with its own current collector or using one or more current collectors for all the drive units together.

In a manner similar to the paths described hitherto, the charging circuit serves to charge the intermediate circuit from the mains. It comprises a charging contactor (LD) and a charging resistor (RL). The main contactor (HS) serves to bridge the charging circuit. During operation, it is closed and the charging circuit remains inactive.

A filter circuit may be required to suppress any harmonics which may occur. In this path, the filter circuit comprises only the filter inductor (Lf). The intermediate-circuit capacitor takes on the function of the filter capacitor. Other filter circuits are conceivable.

Figure 9:
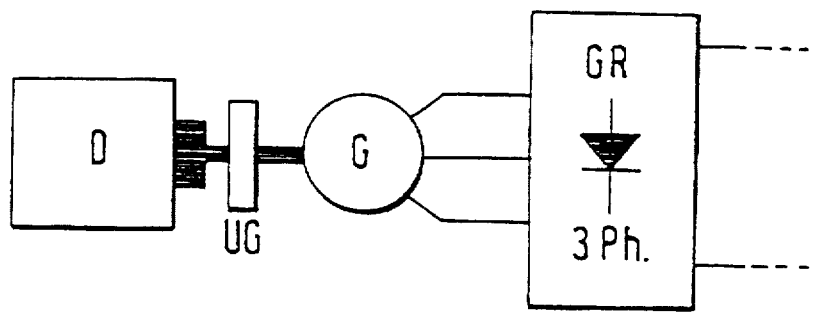
FIG. 9 is a schematic circuit for a generator acted upon by an internal combustion engine.

The generator path depicted in FIG. 9 serves to supply the intermediate circuit from a generator, which is driven by an internal combustion engine, preferably a diesel engine. It includes a driving internal combustion engine (D), redirecting gears (UG) if required, a three-phase generator (G) and a three-phase rectifier (GR). As noted, a diesel engine is preferably used as the internal combustion engine.

The internal combustion engine (D) generates the energy required for driving. It can be operated continuously at the optimum point since the speed of travel and the speed of the internal combustion engine are decoupled. Again, a diesel engine is most suitable in this context.

Under certain circumstances, redirecting gears (UG) are required because of the spatial configuration. The gears can also be used to match different optimum speeds of the internal combustion engine and the generator to one another.

The generator (G) is a three-phase generator, which converts the rotary energy generated by the internal combustion engine into electrical energy. The voltage generated must be high enough to enable the desired intermediate-circuit voltage to be achieved by simple rectification and to be kept in the permissible range even under load.

The rectifier (GR) is preferably a simple, three-phase, non-regulated semiconductor bridge rectifier.

Figure 10:
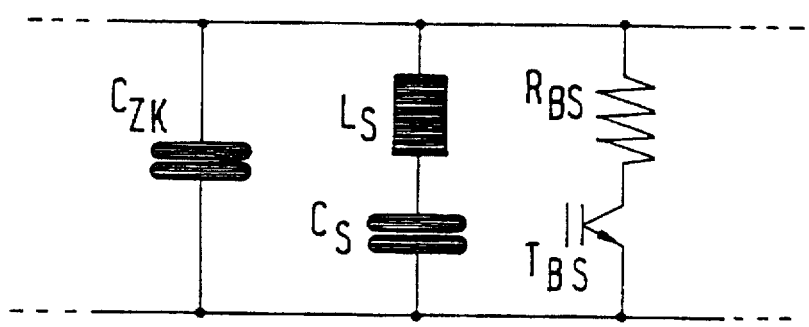
FIG. 10 is diagram of an intermediate circuit with a braking controller.

The intermediate circuit with braking controller illustrated in FIG. 10 has the task of smoothing the currents supplied by the rectifiers, DC converters or four-quadrant converters of the supply paths and to make available a constant intermediate-circuit voltage. The circuit of FIG. 10 thus comprises an intermediate-circuit capacitor (CZK), possibly an auxiliary tuned circuit (LS, CS) and, if required, a braking controller, comprising a braking resistor (RBS) and a switching element (transistor, IGBT, GTO; TBS). It the braking controller is omitted, then there is provided in its stead a (non-illustrated) discharge resistor, which permits a defined discharge of the intermediate circuit.

A capacitor bank of appropriate size and dielectric strength is used as the intermediate-circuit capacitor (C2K).

In the case of AC supply, an auxiliary tuned circuit matched to the frequency of the feed currents can be used to provide additional support for the intermediate-circuit voltage. The auxiliary tuned circuit comprises a series circuit made up of an inductor (LS) and a capacitor (CS).

The braking controller comprises a resistor (RBS) which can be connected up via a switching element (transistor, IGBT or GTO; TBS). Its task is to consume the braking energy absorbed during electric braking if it is not possible to feed the energy back into the mains.

A braking controller is required, inter alia, if an electric brake is desired and, at the same time, a generator path or a DC path with an interface circuit not capable of energy recovery (step-down, step-up, step-up/step-down converter) is used or if, given the desire for an electric brake, mains not capable of receiving are to be expected in electrical operation. In general, a possibility of energy recovery should be given preference over the use of a braking controller.

If a braking controller is dispensed with, a (non-illustrated) discharge resistor which can be connected through a contactor or semiconductor switch is required to enable the intermediate circuit to be discharged when the vehicle is parked. The discharge resistor can be made significantly weaker than the braking resistor because it needs to convert only very small amounts of energy.

The auxiliary-operation supply supplies voltages to feed the auxiliaries (e.g. 3×400 V) and supply the electronic equipment (e.g. 24 V). It essentially comprises one or more converters, which are fed from the intermediate circuit and which generate the corresponding voltages.

Figure 12:
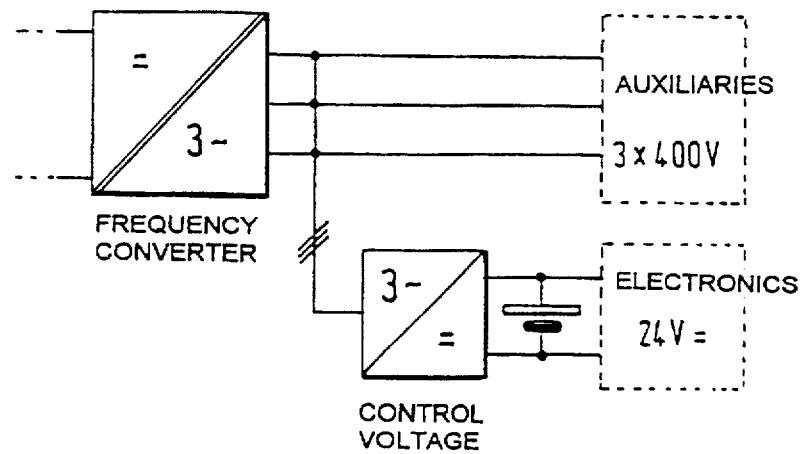
FIG. 12 is a diagram of an exemplary path for traction-motor supply with two traction motors.

These converters have the same structure in principle as the traction inverter of three-phase motors in traction-motor supply. The voltages produced by the auxiliary converters are frequently used to generate further voltages, e.g. control voltages for supplying the vehicle electronics. A frequently employed system for auxiliary supply is illustrated in FIG. 12. The system shown there comprises auxiliary converters with control-voltage generation on the output side. The complete system is commercially available as a unit. Modifications are possible as required.

The auxiliary frequency converter shown herein is a three-phase inverter. The inverter generates, from the intermediate-circuit voltage, the voltage required for the auxiliaries (e.g. 3×400 V three-phase current).

From the voltage for the auxiliaries, the control-voltage generating means generates the control voltage for the supply to the vehicle electronics. As the control-voltage generating means, it is possible, for example, to use a transformer with a rectifier connected to its output. The control voltage is frequently buffered through a battery.

Figure 11:
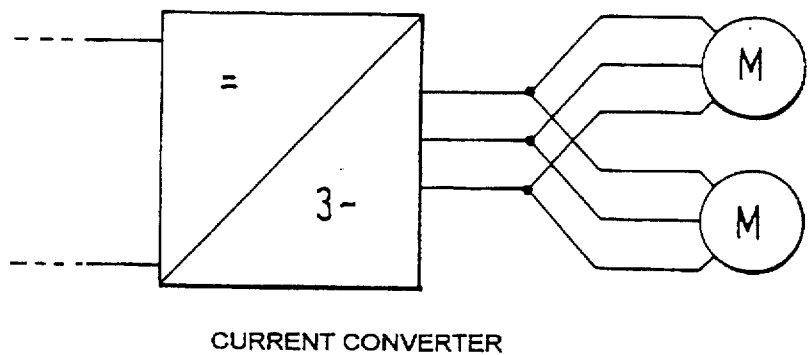
FIG. 11 is a diagram of an exemplary auxiliary operating supply.

The traction-motor supply serves to generate the voltage system required for the traction motors from the intermediate-circuit voltage. It comprises one or more converters (SR), each of which supplies one or more traction motors (M). FIG. 11 shows as an example one path of the traction-motor supply, with a three-phase inverter for the supply of two three-phase traction motors. There can be more than one such path. The use of DC motors by way of a DC converter, which is likewise possible, is not shown specifically here.

From the intermediate-path voltage, the converters (SR) generate the rotating field required for driving the motors (M) connected thereto. IGBT, transistor or GTO converters can be used, depending on the power required. As an example of a possible embodiment of a converter, attention is drawn to the article "Antriebsstromrichter mit Transistoren für Niederflur-Stadtbahnwagen" [Traction Converters With Transistors For Low-Floor Urban Railway Coaches] in the periodical "Der Nahverkehr", 4/1991, Alba Fachverlag Düsseldorf.

Conventional asynchronous machines used in rail transport are used as traction motors (M).

Figure 13:
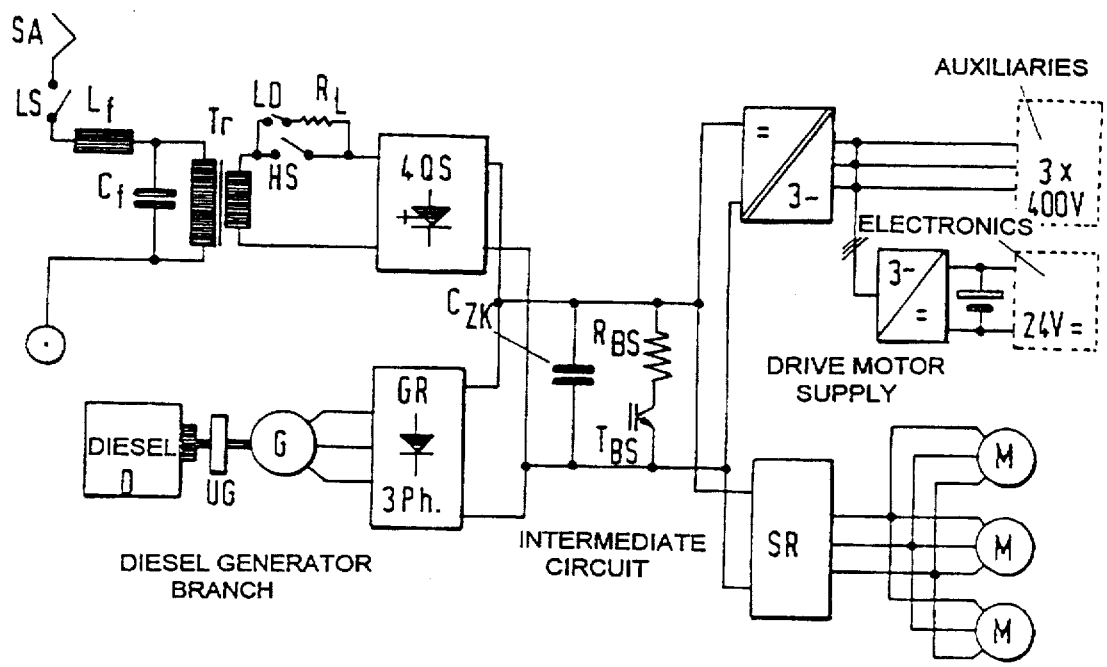
FIG. 13 is a circuit diagram illustrating a configuration for a drive unit for a dual-mode vehicle for electric AC operation and diesel-electric operation.
Figure 14:
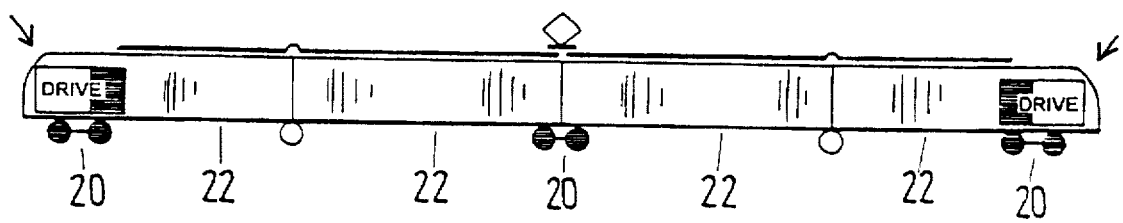
FIG. 14 shows a schematic side elevational view of a four-part motive power unit in accordance with FIG. 10.

With reference to FIGS. 13 and 14, a four-section vehicle with two drive units and six driven axles is considered as an example of a possible embodiment of a dual-mode vehicle with a combined drive for electric AC operation and diesel-electric operation. The vehicle of the example is configured as a dual-mode vehicle for AC operation on the overhead mains and for mains-independent diesel-electric operation. FIG. 13 shows a drive unit for a vehicle of this kind. The schematic of FIG. 14 contains two of the drive units in the vehicle.

The switchover between the operating modes is accomplished by disengagement from one operating mode and subsequent re-engagement in the new operating mode. It is not necessary to discharge the intermediate circuit in the interim, thus speeding up the switchover operation. The only prerequisite is that the vehicle should be equipped for both operating modes and that the prerequisites for both operating modes should be present during the switchover operation. The switchover operation can take place either while the vehicle is stationary or, given appropriate coordination, also while the vehicle is under way. In all cases, however, the drive and the supply to the auxiliaries must be switched off during the switchover operation, with the result that the vehicle may be coasting during the switchover operation.

I claim:

1. A rail-borne motive power unit for conveying passengers, comprising:

a low-floor vehicle coach body having a central part and at least one end part, said central part housing a passenger compartment and being lowered relative to said at least one end part;

said at least one end part being embodied as a motor-coach head and housing a driver's cab;

running-gear assemblies supporting said coach body, and at least one electric drive motor drivingly connected to at least one of said running-gear assemblies;

a drive unit drivingly connected to said at least one drive motor, said drive unit comprising a drive selected from the group of a diesel-mechanical drive, a diesel-electric drive, a purely electric drive, a multi-system drive formed by a combination of a diesel-electric drive with a purely electric drive, a multi-system drive formed by a combination of two different electric drive variants, a multi-system drive formed by a combination of a diesel-electric and two different electric drive variants;

said drive unit is stationary relative to said coach body and said running-gear assemblies are bogies with driven axles; and drive shafts connecting said bogies to said drive unit.

2. The rail-borne power unit according to claim 1, including an automatic multi-speed transmission and a torsionally elastic coupling connecting said diesel-mechanical drive to said at least one running gear assembly.

3. The rail-borne power unit according to claim 1, including a planetary gear transmission connecting a diesel engine to said at least one of said running gear assemblies.

4. The rail-borne power unit according to claim 1, wherein said running gear assemblies have a double-axle drive including a first drive axle connected to said drive unit and a second drive axle adjacent said first drive axle, said second drive axle having an axle reversing gear unit and a drive shaft operatively connecting said second drive axle with a drive transmission.

5. The rail-borne power unit according to claim 4, wherein said coach body has two coach bodies articulatingly connected to one another, each of said two coach bodies being supported on a respective running-gear assembly at an end facing the adjacent coach body.

6. The rail-borne power unit according to claim 1, wherein said diesel-electric drive is selected as said drive unit, said diesel-electric drive including a diesel engine, a generator driven by said diesel engine, and a power converter connected to said generator, said generator supplying said at least one drive motor via said power converter.

7. The rail-borne power unit according to claim 1, wherein said drive unit includes an AC supply with at least one current collector, a transformer connected to said current collector, and a converter connected to said transformer, said converter of said drive unit also connects to said at least one traction motor.

8. The rail-borne power unit according to claim 1, wherein said drive unit includes a DC supply with at least one current collector, and a converter connected to said current collector, said converter of said drive unit is also connected to said at least one traction motor.

9. The rail-borne power unit according to claim 1, wherein said drive unit is a combination of at least two of the following drives:

said diesel-electric drive with a diesel engine and a generator driven by said diesel engine;

an AC drive with an AC supply having at least one current collector and a transformer connected to said current collector;

a DC drive with a DC supply having at least one current collector;

and a common power converter through which said respective drive powers said drive motor.

10. The rail-borne power unit according to claim 1, wherein said coach body has two coach bodies articulatingly connected to one another.

11. The rail-borne power unit according to claim 1, wherein said coach body has two end parts each formed as a motor-coach head with a driver's cab for enabling the rail-borne motive power unit in push-pull operation.

12. A rail-borne motive power unit for conveying passengers, comprising:
a low-floor vehicle coach body having a central part and at least one end part, said central part housing a passenger compartment and being lowered relative to said at least one end part;
said at least one end part being embodied as a motor-coach head and housing a driver's cab;
running-gear assemblies supporting said coach body, and at least one electric drive motor drivingly connected to at least one of said running-gear assemblies;
a drive unit drivingly connected to said at least one drive motor, said drive unit comprising a drive selected from the group of a diesel-mechanical drive, a diesel-electric drive, a purely electric drive, a multi-system drive formed by a combination of a diesel-electric drive with a purely electric drive, a multi-system drive formed by a combination of two different electric drive variants, a multi-system drive formed by a combination of a diesel-electric and two different electric drive variants; and
said diesel-mechanical drive having a diesel engine with a cooling circuit, and a transmission connecting said diesel engine to said at least one of said running gear assemblies, said diesel engine being disposed under said motor-coach head of said coach body.

13. The rail-borne power unit according to claim 12, including spur gears coupling said diesel engine to said transmission, and a drive shaft connecting said diesel engine to a respectively associated said running-gear assembly.

14. The rail-borne power unit according to claim 12, wherein said diesel engine and said transmission are disposed parallel and adjacent to one another.

15. The rail-borne power unit according to claim 12, wherein said diesel engine includes a cooling circuit, and including a heat exchanger communicating with said cooling circuit of said diesel engine for dissipating lost heat of said transmission.

16. The rail-borne power unit according to claim 12, wherein said cooling circuit includes a cooling system with a hydrostatically/hydraulically driven fan drawing cooling air through said drive unit transversely to a direction of travel.

17. The rail-borne power unit according to claim 12, including an automatic gear-change unit connected to and functionally controlling said diesel engine and said transmission.

18. The rail-borne power unit according to claim 17, wherein said automatic gear-change unit includes a diagnostic unit.

19. The rail-borne power unit according to claim 17, wherein said drive unit is remotely controllable, via said automatic gear-change unit, from said driver's cab.

20. The rail-borne power unit according to claim 12, including a lost-heat heat exchanger absorbing waste heat arising from traction and braking operations, said lost-heat heat exchanger being connected for heating said coach body.

21. The rail-borne power unit according to claim 20, wherein said diesel engine includes a cooling circuit, and said lost-heat heat exchanger is connected in parallel with said cooling circuit.

22. The rail-borne power unit according to claim 20, including a heatable hot-water system for preheating the diesel engine.

23. A rail-borne motive power unit for conveying passengers, comprising:
a low-floor vehicle coach body having a central part and at least one end part, said central part housing a passenger compartment and being lowered relative to said at least one end part;
said at least one end part being embodied as a motor-coach head and housing a driver's cab;
running-gear assemblies supporting said coach body, and at least one electric drive motor drivingly connected to at least one of said running-gear assemblies; and
a diesel-mechanical drive, having a diesel engine, drivingly connected to said at least one drive motor; and
a transmission connecting said diesel engine to said at least one of said running gear assemblies, said transmission including a starting converter.

24. The rail-borne power unit according to claim 23, wherein said starting converter is a hydrodynamic converter.

25. The rail-borne power unit according to claim 23, including a bypass for bypassing said starting converter in steady-state operation.

26. The rail-borne power unit according to claim 23, including a hydrodynamic retarder disposed between said starting converter and said transmission for continuously dissipating braking power generated in all gears.

27. The rail-borne power unit according to claim 26, wherein said diesel engine includes a cooling circuit, and including a heat exchanger communicating with said cooling circuit of said diesel engine for dissipating lost heat of said transmission and said retarder.

28. The rail-borne power unit according to claim 27, wherein said cooling circuit includes a cooling system with a hydrostatically/hydraulically driven fan drawing cooling air through said drive unit transversely to a direction of travel.

* * * * *